United States Patent [19]

Bachhuber

[11] Patent Number: 5,796,329
[45] Date of Patent: Aug. 18, 1998

[54] IMMOBILIZER AND METHOD FOR INITIALIZING THE IMMOBILIZER

[75] Inventor: Anton Bachhuber, Langquaid, Germany

[73] Assignee: Siemens Aktiengesellschaft, Munich, Germany

[21] Appl. No.: 681,177

[22] Filed: Jul. 22, 1996

[30] Foreign Application Priority Data

Jul. 20, 1996 [DE] Germany .............. 195 26 530.0

[51] Int. Cl.$^6$ ............................................ B60R 25/10
[52] U.S. Cl. ............... 340/426; 340/825.31; 340/825.34; 180/287; 307/10.2; 361/172
[58] Field of Search ................ 180/287; 307/10.2, 307/10.3, 10.5, 10.6; 340/426, 825.31, 825.34, 425.5, 543, 825.67, 825.72; 361/171, 172

[56] References Cited

U.S. PATENT DOCUMENTS 5,006,843  4/1991  Hauer ..................... 340/825.31
5,229,648  7/1993  Sues et al. ................ 180/287
5,414,403  5/1995  Greuter et al. ........... 338/22 R
5,583,383  12/1996  Denz et al. .............. 307/10.2

FOREIGN PATENT DOCUMENTS 43 33 474  2/1995  Germany .

Primary Examiner—Jeffery Hofsass
Assistant Examiner—Timothy Edwards, Jr.
Attorney, Agent, or Firm—Herbert L. Lerner; Laurence A. Greenberg

[57] ABSTRACT

In an immobilizer and a method for initializing the immobilizer, a multiplicity of control devices, all of which must correctly signal back their identification code word before the vehicle can be started, are integrated in the immobilizer. If a control device is exchanged, the new control device must first be initialized. Key code words of two keys are necessary in order to do this. When both keys are accepted by a testing unit and a release signal is delivered to the testing unit through a diagnostics apparatus, the new code words are stored in the exchanged control device.

8 Claims, 3 Drawing Sheets

IMMOBILIZER AND METHOD FOR INITIALIZING THE IMMOBILIZER

BACKGROUND OF THE INVENTION

1. Field of the Invention

The invention relates to an immobilizer and a method for initializing the immobilizer.

In an immobilizer known from German Published, Non-Prosecuted Patent Application DE 43 33 474 A1, a testing unit is jointly connected by way of a data lead. As soon as it receives a key code word of a key encoder, the testing unit transmits a request signal by way of the data lead to all of the control devices which, as a result thereof, in return transmit identification code words that are compared with desired code words. The testing unit prevents the engine from starting if fewer than a pre-determined number of control devices reply with their identification code word. The testing unit releases all of the control devices if, upon interrogation, at least the pre-determined number of control devices reply correctly with their code word.

If a control device is exchanged, the new control device must first be initialized. During initialization, the data necessary for the operation of the immobilizer are entered in the control device for the first time. However, initialization can only be carried out if authorization is proved through the use of the key encoder. Nevertheless, if the key encoder is stolen together with the motor vehicle, the thief can exchange and re-initialize control devices at will. He or she can also initialize new keys, so that the vehicle is fully at his or her disposal.

SUMMARY OF THE INVENTION

It is accordingly an object of the invention to provide an immobilizer and a method for initializing the immobilizer, which overcome the hereinafore-mentioned disadvantages of the heretofore-known devices and methods of this general type and which provide the highest level of security against unauthorized use of a motor vehicle, even when control devices are exchanged or in the case of theft.

With the foregoing and other objects in view there is provided, in accordance with the invention, a method for initializing an immobilizer, which comprises transmitting respective key code words from two key encoders to a testing unit upon approaching a motor vehicle or upon actuation of each key encoder; transmitting a request signal from the testing unit through a data lead to at least some control devices, causing the control devices to transmit identification code words in return, the identification code words containing the key code words stored in the control devices; comparing the identification code words delivered in return in the testing unit with desired code words stored in the testing unit and with the key code words received by the key encoders; and entering indispensable data for operation of the immobilizer into exchanged control devices or into a further testing unit by the testing unit, if the testing unit receives a starting signal for that purpose, when more than a preset number of control devices reply correctly using their identification code word and the received key code words are recognized as authorized.

In accordance with another mode of the invention, there is provided a method which comprises transmitting the starting signal to the testing unit through a diagnostics apparatus and a diagnostics lead.

With the objects of the invention in view there is also provided an immobilizer for a motor vehicle, comprising a multiplicity of control devices in a motor vehicle, the control devices having a respective identification code word stored or generated therein with the aid of an algorithm, and the control devices having key code words stored therein; a common data lead; at least two testing units being connected to the control devices by the common data lead, desired code words identifying the control devices being stored in each of the testing units or calculated with the aid of an algorithm; at least one of the testing units transmitting a request signal, at least at each engine start, to at least some of the control devices through the data lead, causing the control devices to transmit their identification code words in return; and the identification code words delivered in return being compared with the desired code words in the testing unit, and the testing unit leaving at least one of the control devices in an inactive condition for preventing the motor vehicle from starting or being driven if, upon interrogation for the identification code words, fewer than a predetermined number of the control devices reply with their identification code word, and release all of the control devices if, upon interrogation, at least the pre-determined number of the control devices reply with their identification code word.

In accordance with another feature of the invention, there is provided a key encoder transmitting a key code word for beginning the engine starting.

In accordance with a further feature of the invention, one of the testing units forms a structural unit with one of the control devices.

In accordance with an added feature of the invention, the key encoder is a transponder being delivered with motor vehicle documents and disposed on a mechanical key or on a chip card.

In accordance with an additional feature of the invention, each of the control devices and each of the testing units has a respective memory for storing all of the key codes used with the immobilizer.

In accordance with yet another feature of the invention, each of the testing units contains largely identical data.

With the objects of the invention in view there is additionally provided a method for initializing an immobilizer in a test operation, which comprises transmitting respective key code words from two key encoders to a testing unit upon approaching a motor vehicle or upon actuation of each key encoder; transmitting a request signal from the testing unit to at least some control devices through a data lead, causing the control devices to transmit their identification code words in return, the identification code words containing the key code words stored in the control devices; comparing the identification code words delivered in return in the testing unit with desired code words stored in the testing unit and with the key code words received by the key encoders; and releasing all of the control devices for permitting a preset number of engine starts for a test operation, when more than a pre-determined number of the control devices reply correctly with their identification code word.

In the method and device of the invention, the immobilizer has at least two testing units which are of identical construction. The respective key code word is stored in each control device. As soon as a control device or testing unit is exchanged, the key code words of two key encoders must be transmitted to a testing unit. The testing unit transmits request signals by way of a bus to all or some of the control devices, as a result of which the control devices reply with their identification code word. If the identification code words that are transmitted in return agree with the desired code words and the key encoders are considered to be authorized, the exchanged control device or the exchanged testing device is initialized and, at the same time, receives the data that is indispensable for operation of the immobilizer.

Other features which are considered as characteristic for the invention are set forth in the appended claims.

Although the invention is illustrated and described herein as embodied in an immobilizer and a method for initializing the immobilizer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
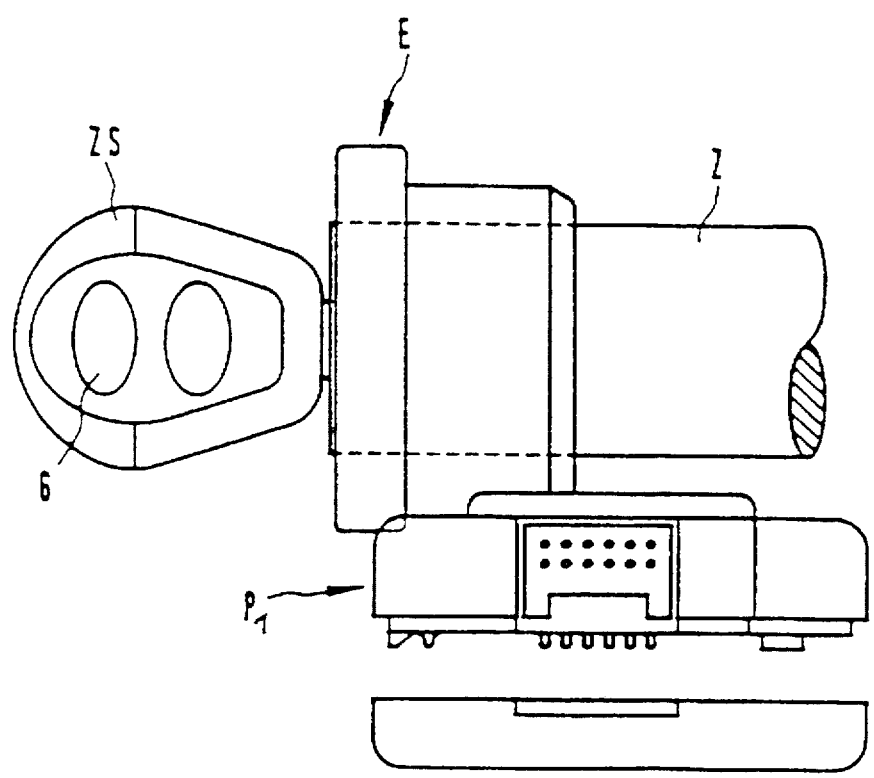
FIG. 1 is a fragmentary, diagrammatic, elevational view of an immobilizer according to the invention.

Referring now to the figures of the drawings in detail and first, particularly, to FIG. 1 thereof, there is seen an immobilizer for a motor vehicle which can prevent use of the motor vehicle by an unauthorized user in accordance with regulations or designations. In order to cancel the immobilizer, a user must enter a key code word. For this purpose, a transponder or key encoder G is disposed on an ignition key ZS. As soon as the ignition key ZS is inserted in an ignition Z and is turned in the lock, the key code word is transmitted. A receiver E, which is disposed around the ignition lock, receives the key code word. The key code word is passed to one or more testing units $P_1$. If several users are to be authorized, they each have their own key encoder $G_1$ to $G_5$ shown in FIG. 2, in which respective characteristic key code words $T_i$ (where i=1 to 5) are contained.

Figure 2:
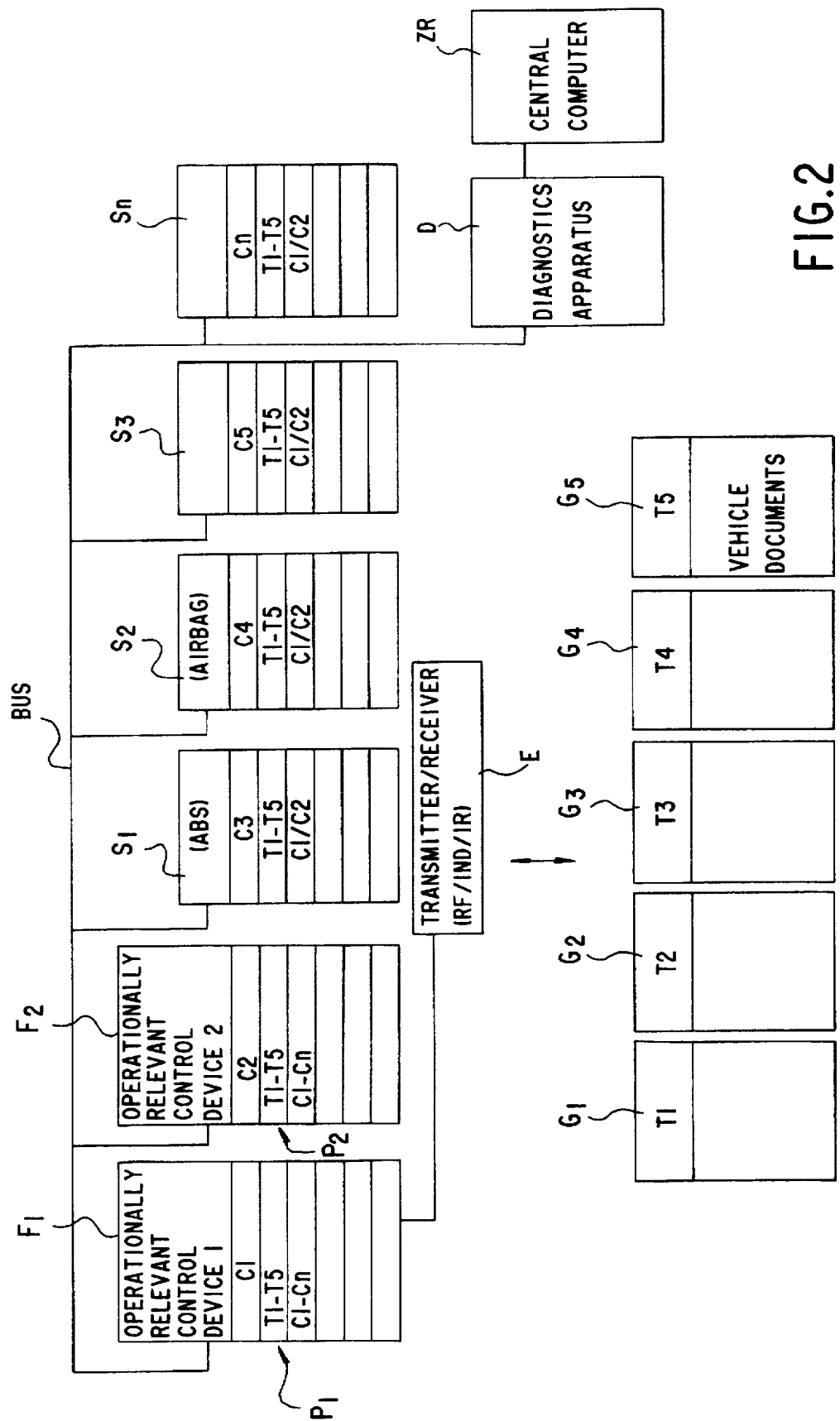
FIG. 2 is a block diagram of the immobilizer.

The testing unit $P_1$ and another testing unit $P_2$ shown in FIG. 2 are connected by way of a bus lead BUS to control devices $S_i$ and $F_j$ (where i=1 to 2 and j=1 to m, with $S_i$ being the control devices that are relevant for operation, such as the engine control or automatic transmission control, and $F_j$ being the control devices that are not relevant for operation, such as the airbag or ABS control device, for example). All of the control devices $S_i$ and $F_j$ are present in any case, for example the control devices for ignition, ABS, central locking, gears and self-leveling, etc.

As soon as a testing unit $P_1$ or $P_2$ has received the key code word $T_i$ it transmits a request signal to all or some of the control devices $S_i$ and $F_j$ by way of the data lead BUS. In this way, the control devices $S_i$ and $F_j$ are caused in return to transmit their identification code words $C_k$ (where k=1 to n), which are compared in the testing unit $P_1$ or $P_2$ with desired code words that are stored there. If, upon interrogation for the identification code word $C_k$, fewer than a pre-determined number of control devices $S_i$ and $F_j$ reply with their identification word $C_k$, the testing unit $P_1$ or $P_2$ leaves at least one control device $S_i$ or $F_j$ in the inactive condition. The immobilizer therefore remains activated.

However, if all of the control devices $S_i$ and $F_j$, or at least more than a pre-determined number of control devices $S_i$ and $F_j$ reply using a correct identification code word $C_k$, all of the control devices $S_i$ and $F_j$ are released. The immobilizer is therefore deactivated.

Each testing unit $P_1$ or $P_2$ stores all of the key code words $T_i$ of the key encoders $G_i$ that are used, as well as all of the identification code words $C_k$ of the control devices $S_i$ and $F_j$. Since at least two testing units $P_1$ and $P_2$, in which identical data are stored, are present, the vehicle remains ready to drive even if one of the two testing units $P_1$ or $P_2$ is defective.

Similarly, the control devices $S_i$ and $F_j$ store all of the key code words $T_i$ of the key encoders $G_i$ that are used, as well as the identification code words $C_1$ and $C_2$ of the testing units $P_1$ and $P_2$. Upon interrogation for the identification code words, the key code words $T_i$ stored in the control devices $S_i$ and $F_j$ are transmitted to the testing unit $P_i$ or $P_2$. In this way it is ensured that only a key encoder $G_i$ originally assigned to the immobilizer through the use of an initialization can also deactivate the immobilizer.

The control devices $S_i$ that are relevant for operation, that is to say those control devices which are absolutely necessary for operation of the motor vehicle, are placed in an inactive condition when the motor vehicle is switched off. The testing units $P_1$ and $P_2$, which are likewise blocked when the motor vehicle is switched off, also belong to the control devices $S_i$ that are relevant for operation. The inactive condition can only be canceled once more through the use of an authorized key encoder $G_i$.

If one of the control devices $F_j$ that is not relevant for operation and not absolutely necessary for operating the motor vehicle, is defective and must be replaced, it cannot receive the request signal at all, or it can only reply by using an incorrect identification code word $C_k$. This code word is recognized by the testing unit $P_1$ or $P_2$. The driver's attention is drawn to this error by optical or acoustic devices. Consequently, the motor vehicle can still be driven to the nearest service station where the defective control device $F_j$ can be repaired or exchanged.

For this reason, upon interrogation for the identification code words $C_k$, it is sufficient if at least a pre-determined number of the control devices $S_i$ and $F_j$, but not all of them, reply with their identification code word $C_k$. If, for example, four control devices $S_i$ and $F_j$ are interrogated it is sufficient for three to reply by using a valid identification code word $C_k$. The availability of the motor vehicle is thus ensured at all times.

However, if fewer than the pre-determined number of control devices $S_i$ and $F_j$ reply with their identification code word, the testing unit $P_1$ or $P_2$ leaves at least one control device $S_i$ in an inactive condition so that the vehicle is prevented from being started or driven.

New control devices $S_i$ and $F_j$ are in a basic condition to start with (new mode). The new mode is recognized by the testing unit $P_1$ or $P_2$. When all of the control devices $S_i$ and $F_j$ are in the new mode they are initialized with an identification code word $C_k$, that is to say the identification code word is stored in the control device. Likewise, all of the key encoders $G_i$ that are provided for the vehicle are provided with a key code word $T_i$ (initialization).

This takes place, for example, after manufacture of the motor vehicle, that is to say at the end of the automobile manufacturer's assembly line, with the aid of a non-illustrated authorized identification encoder. This identification encoder can be a diagnostics apparatus D which can be connected to a central computer ZR of the automobile manufacturer.

The central computer ZR stores the identification code words $C_k$ of all of the control devices $S_i$ and $F_j$ that are present in the motor vehicle, as well as the key code words $T_i$ of all of the key encoders $G_i$ that are used. All of the identification code words and key code words of all of the automobile manufacturer's vehicles are also stored there. However, upon an authorized interrogation from a diagnostics apparatus D only the data which are necessary for the initialization and for which authorization has been proved, for example through the use of the key encoder $G_5$ which is located with the vehicle documents, are transmitted to the diagnostics device D. For this reason, only a few authorized persons have access to the central computer ZR.

During initialization it is established which control devices $S_i$ and $F_j$ are to be tested at all by the testing units $P_1$ or $P_2$.

The first initialization is irreversible, that is to say, it cannot be canceled by a thief. Afterwards, therefore, the control devices $S_i$ and $F_j$ can no longer receive the first initialization.

After the first initialization the control devices $S_i$ and $F_j$ change to an operating mode. The motor vehicle can only be started in the operating mode if the identification code interrogation has been triggered by an authorized key encoder $G_i$ and a minimum number of control devices $S_i$ and $F_j$ connected to the testing unit $P_1$ or $P_2$ by way of the data lead BUS, reply correctly.

New control devices exchanged for defective control devices $S_i$ and $F_j$ or testing units $P_1$ and $P_2$ are similarly in the new mode to begin with. As soon as one of the two testing units $P_1$ or $P_2$ recognizes that one or more control devices are in a new mode, (re-)initialization is carried out.

A so-called re-initialization of this type can take place by way of a diagnostics interface D which is present in any case in the motor vehicle and is connected to the data lead BUS. Nevertheless, the user wishing to carry out the re-initialization must provide himself or herself with authorization in advance through the use of two key encoders $G_i$.

Figure 3:
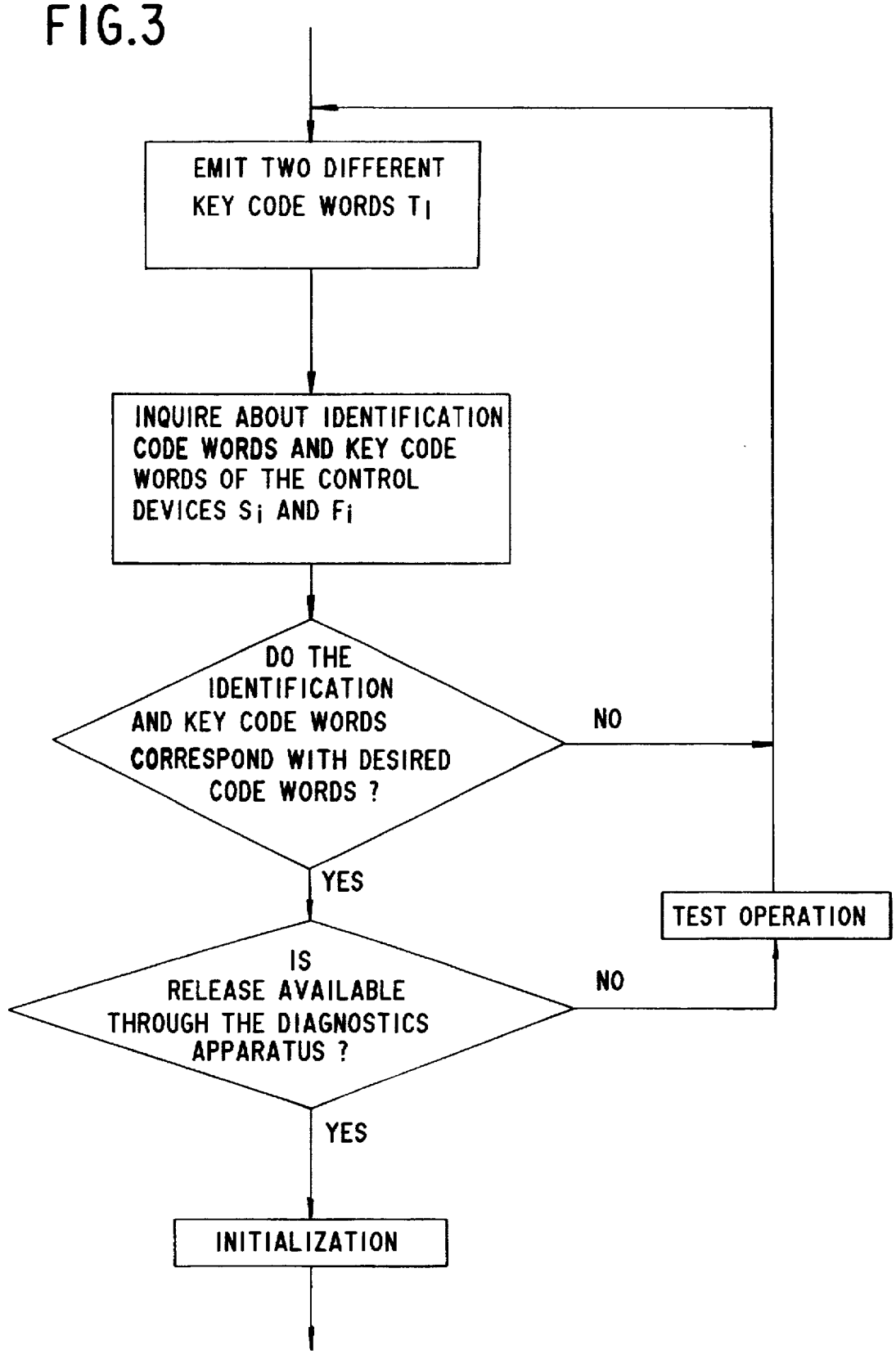
FIG. 3 is a flow diagram of a method for initializing the immobilizer.

For this purpose, as is seen in FIG. 3, two key encoders, for example $G_2$ and $G_3$, each successively transmit their respective key code word $T_2$ and $T_3$ to one of the testing units $P_1$ or $P_2$ upon approaching the motor vehicle or upon actuation of each key encoder $G_2$ and $G_3$. In turn, the testing unit $P_1$ or $P_2$ transmits a request signal by way of the data lead BUS to all or some of the control devices $S_i$ and $F_j$, as a result of which the control devices are caused to transmit their identification code words $C_k$ in return.

The key code words $T_i$ stored in the control devices $S_i$ and $F_j$ are contained in the identification code words $C_k$. The testing unit $P_1$ or $P_2$ therefore distinguishes whether or not the key code words $T_2$ and $T_3$ transmitted by the key encoders $G_2$ and $G_3$ agree with the key code words $T_i$ stored in the control devices $S_i$ and $F_j$. If they do, the two key encoders $G_2$ and $G_3$ are authorized to commence the initialization or start the engine.

When more than a pre-determined number of control devices $S_i$ and $F_j$ reply correctly by using their identification code word $C_k$ and the received key code words $T_i$ are recognized as authorized, and a release signal is received by way of the diagnostics apparatus D, the indispensable data for operation of the immobilizer are entered by the testing unit $P_1$ or $P_2$ into the exchanged control devices $S_i$ and $F_j$ or into the further testing unit $P_i$, which was defective.

If a testing unit $P_i$ is being exchanged, not only are data entered in the new testing unit but the identification code word $C_k$ of the new testing unit is also communicated to the remaining control devices $S_i$ and $F_j$, if it is not already contained in the control device. When a new key encoder $G_i$ is added during an authorized initialization, its key code word $T_i$ is also communicated to all of the participating control devices.

The data necessary for the initialization can also be supplied to the control devices $S_i$ and $F_j$ by way of a diagnostics apparatus D. However, an initialization only takes place when at least two key encoders $G_i$ have transmitted their correct, authorized key code words $T_i$ and when the initialization is released by way of the diagnostics apparatus D.

If the initialization is not released by the diagnostics apparatus D, a test operation with an exchanged control device can be undertaken in a service station or workshop. The initialization can only be carried out after it has been established that the previously defective control device $S_i$ or $F_j$ has been correctly replaced. Two key encoders, for example $G_2$ and $G_3$, are already necessary for the test operation in the workshop. When one of the control devices $S_i$ or $F_j$ is exchanged or a new control device is added, the vehicle can only be started when there are at least two key encoders $G_i$ present.

In this way, a thief who has stolen the vehicle together with a key encoder $G_i$ is prevented from exchanging control devices and copying them, even in an initialized condition, as well as the key encoders $G_i$, so as to have the motor vehicle fully at his or her disposal. All of the control devices $S_i$ and $F_j$ would have to be exchanged for the vehicle to be available as well.

If two new testing units, which replace the old testing units $P_1$ and $P_2$, are installed in the motor vehicle without authorization, together with a key encoder matching them, this is detected by the control devices $S_i$ and $F_j$. In this case, the control devices $S_i$ and $F_j$ block themselves. The motor vehicle can then only be operated to a limited extent and is largely without value to a thief.

With the method for initializing an immobilizer according to the invention, the thief cannot carry out a re-initialization using only one key encoder $G_i$ and cannot make additional key encoders $G_i$ either. As a result, the thief will also have problems reselling the vehicle since the value of the vehicle reduces considerably. This makes theft of the vehicle unattractive.

An advantage of this method is that it can be used to carry out a test operation in a workshop with any exchange control device, without re-initializing the vehicle.

Likewise, with the method according to the invention, new control devices can be added to the motor vehicle and tested for the first time before they are initialized. However, at each starting procedure in the test operation, two key encoders $G_i$ are necessary. If these are present, a test operation can take place with a temporary control device. It is only when the control device has been finally exchanged that the initialization can be released by way of the diagnostics apparatus D. There is thus a clear distinction from normal operation, in which the immobilizer can be deactivated simply by one key encoder $G_i$.

Provision can be made in the test operation for only a preset number of engine starts to be possible. After that, an initialization must be performed or the test operation must be begun again by way of two key encoders $G_i$.

If one of the two testing units $P_1$ or $P_2$ is defective, the other testing unit $P_1$ or $P_2$, respectively, blocks its own operation as well as the operation of the other control devices $S_i$ or $F_j$. Consequently, an initialization is necessary.

A key encoder $G_5$ can be delivered with the motor vehicle documents. This key encoder $G_5$ has a transponder on a key or on a chip card and can be glued into the motor vehicle documents. This key encoder GS can always be kept safely at home. Another key encoder $G_i$, which the user carries with him or her while traveling, is sufficient for driving the motor vehicle but cannot be used by itself for an initialization.

As is shown in FIG. 2, the testing units $P_1$ and $P_2$ can be contained in the control devices $S_i$ that are relevant for operation or, as is shown in FIG. 1, they can be disposed in the motor vehicle as independent control devices. The key encoders $G_i$ preferably have transponders which transmit the key code word $T_i$ by wireless devices (by RF, infrared or inductive signals) to the receiver E when excited by a power signal of the receiver E (which therefore also has a transmitter).

The term "initialization" is to be understood to mean that the data required for operation of the immobilizer are entered in the control devices $S_i$ or $F_j$ or the key encoders $G_i$ when they are exchanged or added.

In the exemplary embodiment, the identification code words $C_k$ and the key code words $T_1$ are stored uncoded in a memory and are transmitted in code on request. The testing units $P_i$ can decode the data and compare them with desired values.

I claim:

1. A method for initializing an immobilizer, which comprises:

transmitting respective key code words from two key encoders to a testing unit upon actuation of each key encoder;

transmitting a request signal from the testing unit through a data lead to at least some control devices, causing the control devices to transmit identification code words in return, the identification code words containing the key code words stored in the control devices;

comparing the identification code words delivered in return in the testing unit with desired code words stored in the testing unit and with the key code words received from the two key encoders;

entering indispensable data for operation of the immobilizer into exchanged control devices or into a further testing unit by the testing unit, if the testing unit receives a starting signal for that purpose, when more than a preset number of control devices reply correctly using their identification code word and the received key code words are recognized as authorized; and preventing the entering of the indispensable data for operation of the immobilizer into the exchanged control devices and the testing unit if the key code words are not received from the two key encoders.

2. The method according to claim 1, which comprises transmitting the starting signal to the testing unit through a diagnostics apparatus and a diagnostics lead.

3. An immobilizer for a motor vehicle, comprising:

a multiplicity of control devices in a motor vehicle, said control devices having a respective identification code word stored or generated therein with the aid of an algorithm, and said control devices having key code words stored therein;

a common data lead;

at least two testing units being connected to said control devices by said common data lead, desired code words identifying said control devices being stored in each of said testing units or calculated with the aid of an algorithm;

a first key encoder transmitting a key code word to said testing units for beginning an engine starting;

at least one of said testing units transmitting a request signal, at least at each engine start, to at least some of said control devices through said data lead, causing said control devices to transmit their identification code words in return;

the identification code words delivered in return being compared with the desired code words in said testing unit, and said testing unit leaving at least one of said control devices in an inactive condition for preventing the motor vehicle from starting or being driven if, upon interrogation for the identification code words, fewer than a predetermined number of said control devices reply with their identification code word, and release all of said control devices if, upon interrogation, at least said pre-determined number of said control devices reply with their identification code word; and a second key encoder transmitting a second key code word to said testing units for authorizing said testing units to update the identification code word on one of said control devices.

4. The immobilizer according to claim 3, wherein one of said testing units forms a structural unit with one of said control devices.

5. The immobilizer according to claim 3, wherein said key encoder is a transponder being delivered with motor vehicle documents and disposed on a mechanical key or on a chip card.

6. The immobilizer according to claim 3, wherein each of said control devices and each of said testing units has a respective memory for storing all of the key codes used with the immobilizer.

7. The immobilizer according to claim 3, wherein each of said testing units contains largely identical data.

8. A method for initializing an immobilizer in a test operation, which comprises:

transmitting respective key code words from two key encoders to a testing unit upon actuation of each key encoder;

transmitting a request signal from the testing unit to at least some control devices through a data lead, causing the control devices to transmit their identification code words in return, the identification code words containing the key code words stored in the control devices;

comparing the identification code words delivered in return in the testing unit with desired code words stored in the testing unit and with the key code words received from the two key encoders;

releasing all of the control devices for permitting a preset number of engine starts for a test operation, when more than a pre-determined number of the control devices reply correctly with their identification code word; and preventing the release of the control devices if the key code words are not received from the two key encoders.

* * * * *